UNITED STATES PATENT OFFICE.

ALFRED HANS, OF FRIEDENAU, NEAR BERLIN, GERMANY.

PROCESS OF PRODUCING PHOTOGRAPHS ON METAL, GLASS, PORCELAIN, &c.

No. 874,005.  Specification of Letters Patent.  Patented Dec. 17, 1907.

Application filed January 18, 1907. Serial No. 352,641.

*To all whom it may concern:*

Be it known that I, ALFRED HANS, of Friedenau, near Berlin, Germany, a subject of the King of Prussia, and whose post-office address is No. 14 Rubenstrasse, Friedenau, near Berlin, Prussia, German Empire, have invented a new and useful Process of Producing Photographs on Metal, Glass, Porcelain, and the Like; and I do hereby declare that the following is a full, clear, and exact description of my invention, which will enable others skilled in the art to which it appertains to make and use the same.

This invention relates to improvements upon the known process of producing photographs on metal, glass, porcelain and the like supporting substances by covering the metal or its substitute with a layer of chromatized fish-glue, exposing the dried layer under a negative, developing and baking. By practicing this process in the usual manner, photographs are obtained which are not able to resist the action of alkaline liquids and which are apt to crack and shell off when their support is bent.

It is the object of the present invention to remove the said inconveniences and, moreover, to obtain photographs of a deeper black coloration than hitherto.

The present invention essentially consists in treating the developed image prior to baking with the solution of a tanning agent. As such agent I prefer to use hydroquinone, because of its peculiar tanning action upon fish-glue. Moreover, this substance has the property of causing a deep black coloration of the image to be produced in the baking step, provided the tanned image be dipped for some time in a solution of log-wood extract. The same effect is obtained by dipping the developed image for some time in a mixture of the hydroquinone solution and log-wood extract.

It is well known that it is necessary to mix the chromatized fish-glue with a saccharine substance in order to prevent it from becoming brittle in the baking step. As such saccharine substance I prefer to use a concentrated decoction of malt, such as dark beer rich in malt, as malt has proved to give a high degree of tenacity to the chromatized fish-glue when a mixture of both is exposed to the action of heat.

In carrying out the improved process, I prefer to proceed as follows: I prepare a compound solution composed of 400 cubic centimeters fish-glue, 40 to 60 grams bichromate of ammonium and 700 cubic centimeters of dark beer which is rich in malt. The blank of metal, glass or porcelain is covered with a layer of the above solution and the layer dried preferably by means of a centrifugal drier. After drying the blank is placed with its sensitive layer of chromatized fish-glue under the photographic negative of the image to be reproduced, exposed, and after exposure washed with water in order to develop the image. After development the blank with the image adhering thereto is placed in a tanning bath consisting in an aqueous solution of hydroquinone having from 5 to 10 per cent. Finally the blank and adhering tanned image are exposed to the action of heat, which step is called baking, whereby a black colored image is obtained. I prefer to carry out the baking in a closed furnace (muffle, covered hearth and the like) as by this way a more uniform and a more brilliant black is obtained than by baking on open fire.

After baking the plate obtained may be treated by means of the usual embellishing processes without doing harm to the photograph; for instance if the plate consists of metal, it may be silvered by the well-known galvanic silvering process or by being rubbed with a solution of silver cyanid or it may be coated with metals or oxids by means of other known processes. The silvering of course does not extend over the photograph itself.

To produce a deep black coloration by the baking step, I prefer to mix the tanning hydroquinone-solution with some log-wood extract. A similar effect may be obtained by using instead of log-wood extract other colors of vegetable or animal origin, such as indigo, cochineal and the like. I call these colors black-deepening agents, and I wish it to be understood that the term "black-deepening agent" as used in the annexed claims shall comprise any color of vegetable or animal origin capable of being substituted for log-wood extract in the described process.

The fish-glue may be replaced wholly or in part by cologne-glue, gum arabic or casein-glue. For this reason the term chromatized glue as used in the annexed claims is intended to comprise chromatized fish-glue as well as its named chromatized substitutes and mixtures of both.

Having fully described my invention, what

I desire to claim, and secure by Letters Patent of the United States, is:—

1. The process of producing photographs on metal, glass, porcelain and the like support, which consists in covering said support with a layer of chromatized glue mixed with a saccharine substance, covering the dried layer with a photographic negative, exposing, developing by washing with water, treating the developed image with a tanning agent and baking, substantially as and for the purpose stated.

2. The process of producing photographs on metal, glass, porcelain and the like supports which consists in covering said support with a layer of chromatized glue mixed with a saccharine substance, covering the dried layer with a photographic negative, exposing, developing by washing with water, tanning the developed image with an aqueous solution of hydroquinone, and baking, substantially as and for the purpose stated.

3. The process of producing photographs on metal, glass, porcelain and the like supports which consists in covering said support with a layer of chromatized glue mixed with a saccharine substance, covering the dried layer with a photographic negative, exposing, developing the image by washing with water, tanning the developed image with an aqueous solution of hydroquinone mixed with a black-deepening agent, and baking, substantially as and for the purpose stated.

4. The process of producing photographs on metal, glass, porcelain and the like supports which consists in covering said support with a layer of chromatized glue mixed with a saccharine substance, covering the dried layer with a photographic negative, exposing, developing by washing with water, tanning the developed image with an aqueous solution of hydroquinone mixed with log-wood extract, and baking, substantially as and for the purpose stated.

In testimony whereof I have hereunto set my hand in presence of two subscribing witnesses.

ALFRED HANS.

Witnesses:
 WOLDEMAR HAUPT,
 HENRY HASPER.